US008436888B1

(12) United States Patent
Baldino et al.

(10) Patent No.: US 8,436,888 B1
(45) Date of Patent: May 7, 2013

(54) DETECTION OF A LECTURER IN A VIDEOCONFERENCE

(75) Inventors: Brian James Baldino, San Jose, CA (US); Michael Brian Hubenthal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1478 days.

(21) Appl. No.: 12/033,950

(22) Filed: Feb. 20, 2008

(51) Int. Cl.
*H04N 7/14* (2006.01)

(52) U.S. Cl.
USPC ........................................... 348/14.08

(58) Field of Classification Search ............... 348/14.1, 348/14.01–14.03, 14.06–14.09, 14.16
See application file for complete search history.

(56) References Cited

U.S. PATENT DOCUMENTS

| | | | |
|---|---|---|---|
| 6,125,343 A * | 9/2000 | Schuster | 704/201 |
| 6,317,776 B1 * | 11/2001 | Broussard et al. | 709/204 |
| 6,980,526 B2 | 12/2005 | Jang et al. | |
| 6,989,856 B2 | 1/2006 | Firestone et al. | |
| 7,920,158 B1 * | 4/2011 | Beck et al. | 348/14.08 |
| 2005/0078170 A1 | 4/2005 | Firestone et al. | |
| 2006/0092269 A1 | 5/2006 | Baird et al. | |
| 2006/0248210 A1 * | 11/2006 | Kenoyer | 709/231 |
| 2007/0206091 A1 | 9/2007 | Dunn et al. | |
| 2007/0263823 A1 * | 11/2007 | Jalava et al. | 379/202.01 |
| 2007/0299981 A1 | 12/2007 | Baird | |

OTHER PUBLICATIONS

"Cisco TelePresence Multipoint Switch", Cisco Systems Inc., pp. 1-5 (1992-2007).
"Cisco TelePresence Manager 1.2", Cisco Systems Inc., pp. 1-5 (1992-2007).
"Cisco TelePresence", Cisco Systems Inc., pp. 1-5 (1992-2007).
"Cisco TelePresence 3000", Cisco Systems Inc., pp. 1-6 (1992-2007).

* cited by examiner

*Primary Examiner* — Brandon Miller
(74) *Attorney, Agent, or Firm* — Edell, Shapiro & Finnan, LLC

(57) ABSTRACT

In one embodiment, a system detects a lecturer within a videoconference. The system includes two or more participant systems and a media switch coupled to each of the participant systems. The media switch includes a switch processor to receive and process audio and video information from the participant systems. The switch processor analyzes loudness metric values of active speakers and designates a particular speaker as a lecturer. In addition, the switch processor provides audio and video information of the remaining conference participants to the lecturer participant system to rotate through conference participants with each participant being displayed to the lecturer for a predetermined interval (e.g., in a round robin fashion), thereby enabling the lecturer to view the entire audience.

22 Claims, 4 Drawing Sheets

DETECTION OF A LECTURER IN A VIDEOCONFERENCE

TECHNICAL FIELD

The present disclosure relates generally to videoconferencing.

BACKGROUND

Videoconferencing systems enable a conference to be conducted with participants at various remote sites. These systems include various devices to capture audio and video of remote conference participants and to appropriately distribute the captured information to those participants at remote sites. This enables each participant to view video images and listen to the verbal contributions of the other conference participants.

BRIEF DESCRIPTION OF THE DRAWINGS

The features and advantages of the lecturer detection of the present disclosure will become apparent upon consideration of the following description of example embodiments thereof, particularly when taken in conjunction with the accompanying drawings wherein like reference numerals in the various figures are utilized to designate like components.

DESCRIPTION OF EXAMPLE EMBODIMENTS

Overview

An embodiment of the present invention includes a system to detect a lecturer within a videoconference. The system includes two or more participant systems and a media switch coupled to each of the participant systems. The media switch includes a switch processor to receive and process audio and video information from the participant systems. The switch processor analyzes loudness metric values of active speakers and designates a particular speaker as a lecturer. In addition, the switch processor provides audio and video information of the remaining conference participants to the lecturer participant system to rotate through conference participants with each participant being displayed to the lecturer for a predetermined interval (e.g., in a round robin fashion), thereby enabling the lecturer to view the entire audience.

Example Embodiments

Figure 1:
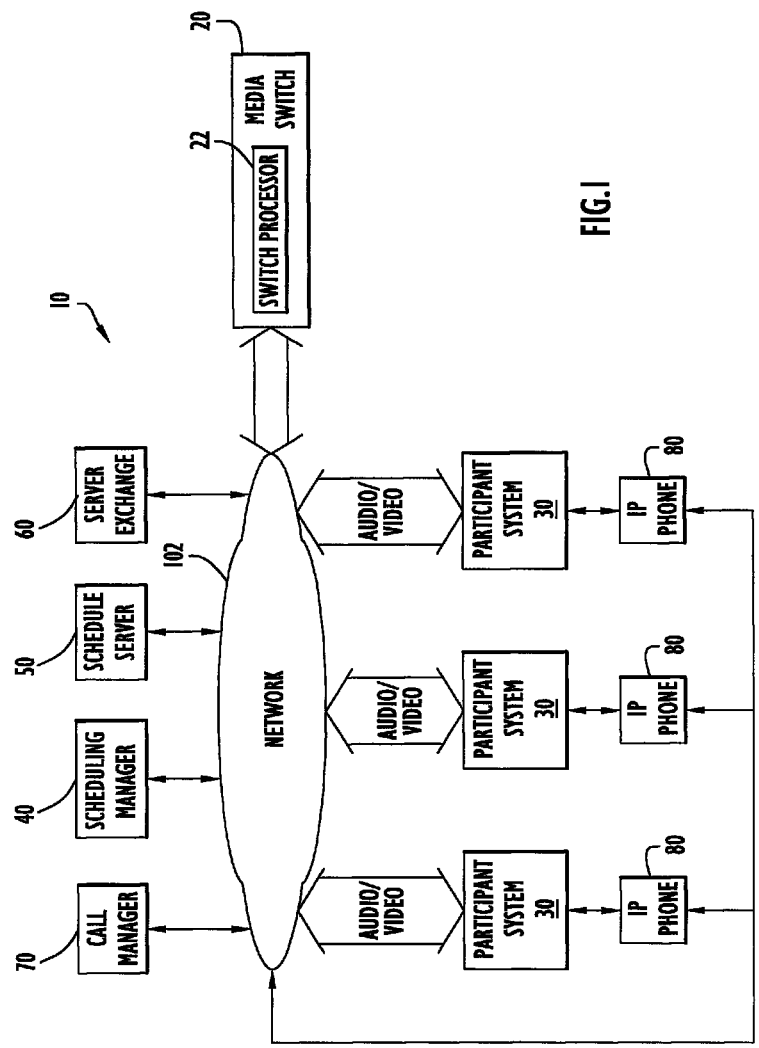
FIG. 1 is a block diagram of an example videoconferencing system according to an embodiment of the present invention.

An example videoconferencing system according to an embodiment of the present invention is illustrated in FIG. 1. Specifically, videoconference system 10 includes a media switch 20 and two or more participant systems 30. Each participant system 30 is typically disposed at a remote site, and captures audio and video information of conference participants at that site for transference to media switch 20 as described below. Media switch 20 is coupled to each participant system 30 via a network 102, and includes a switch processor 22 (and any conventional or other switching hardware (not shown)) to process and distribute the conference participant information (e.g., audio, video, etc.) over the network among the participant systems in order to conduct a videoconference as described below. The switch processor may be implemented by any conventional or other processor, device or circuitry (e.g., microprocessor, controller, processing system, circuitry, logic, etc.) to process and distribute the information. The switch processor may include any commercially available or custom software (e.g., communications software, switching control software, media processing software, etc.) to perform the functions described herein. The participant systems further receive audio and video information (e.g., in the form of audio and video packets) from media switch 20 to respectively provide audio and video images of remote conference participants at the remote site. Thus, system 10 provides and distributes audio and video information of remote participants to each other to simulate an actual conference, where remote participants conduct the conference in relation to a virtual conference table.

System 10 may further include a scheduling manager 40, a schedule server 50, a server exchange 60 and a call manager 70 to generally handle administrative tasks. In particular, media switch 20 may further be coupled via network 102 to scheduling manager 40, server exchange 60 and call manager 70. Server exchange 60 basically functions as a gateway to particular networks, preferably those of the videoconference service provider. The scheduling manager generally establishes a time for the call or videoconference. The scheduling manager may be coupled via the network to schedule server 50 that enables users to establish times for videoconferences through common applications (e.g., Microsoft Outlook, etc.). Scheduling manager 40 may further be coupled via the network to call manager 70 that initiates a call or videoconference and handles call control functions. The call manager may communicate with participant systems 30 over the network via Internet Protocol (IP) telephones 80, each associated with a corresponding participant system. The IP telephones may be implemented by any conventional or other communications devices compatible with the Internet Protocol or any suitable communication schemes. The call manager and participant systems may establish a videoconference session using any suitable technology and/or protocol (e.g., Session Initiation Protocol (SIP), H.323, etc.). The scheduling manager, schedule server, server exchange and call manager may be implemented by any conventional or other computer or processing systems preferably equipped with one or more processors, memories, communications devices (e.g., modem, network cards, etc.) and/or any commercially available or custom software (e.g., operating system, communications software, server software, scheduling software, etc.) to perform the functions described above.

System 10 may be utilized for videoconferencing between two or more participant systems 30, where captured audio and video information are transferred between the participant systems by media switch 20 as described above. By way example only, system 10 includes three participant systems 30, each preferably disposed at a remote site. However, the system may include any quantity of participant systems or sites.

Figure 2:
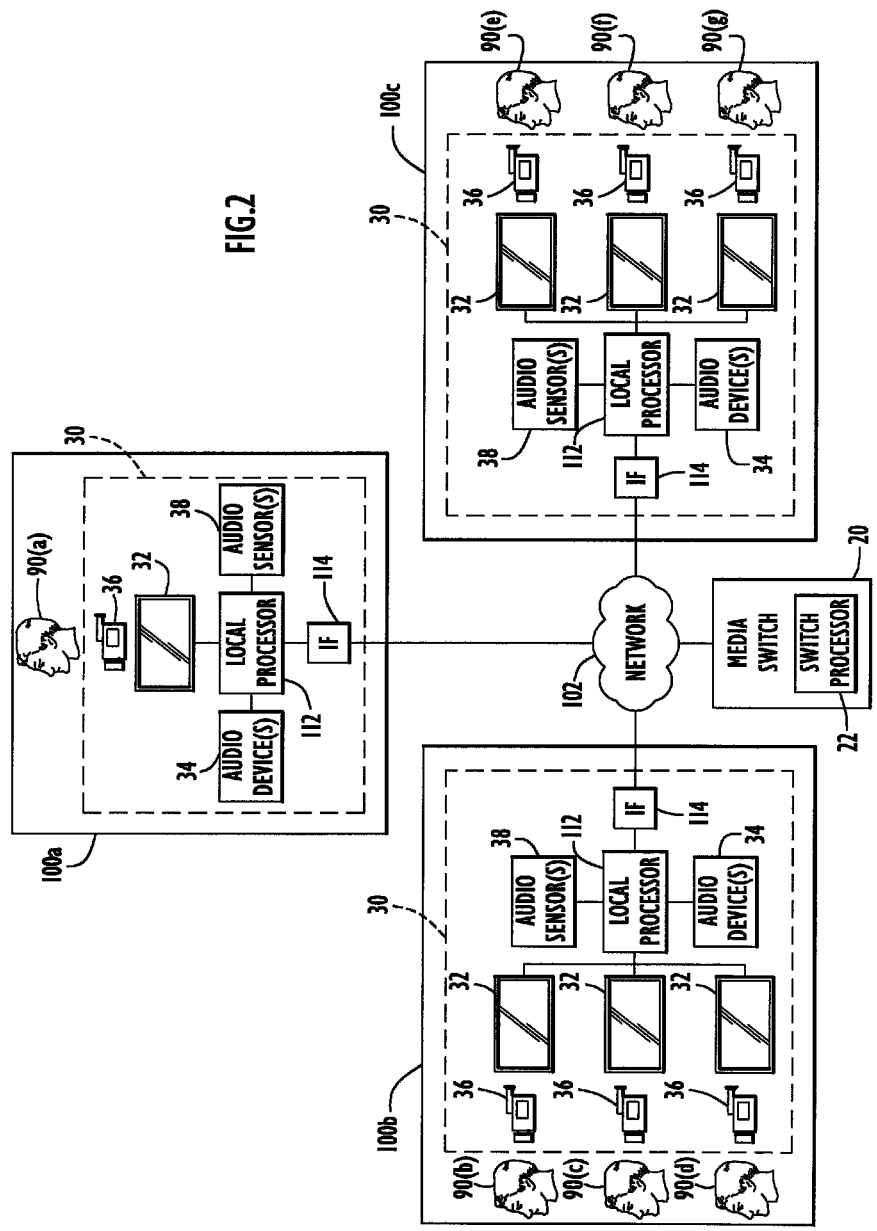
FIG. 2 is a block diagram of example participant systems for the videoconferencing system of FIG. 1 interconnected by a network according to an embodiment of the present invention.

Referring to FIG. 2, system 10 includes, by way of example, three participant systems 30 each preferably disposed at a respective remote site 100a, 100b and 100c. Participant systems 30 may be configured for one or three participants. For example, participant system 30 at remote site 100a is configured to accommodate a single conference participant 90a. Participant system 30 at remote site 100b is configured to accommodate plural conference participants 90b, 90c, 90d, while participant system 30 at remote site 100c is similarly configured to accommodate plural conference participants 90e, 90f, 90g. However, the participant systems may be configured to accommodate any desired quantity of conference participants. The participant systems enable videoconferencing among respective participants 90a, 90b-90d and 90e-90g at remote sites 100a, 100b, 100c.

Each participant system 30 may include any suitable elements to establish and facilitate the videoconference. For example, participant systems 30 at remote sites 100a, 100b, 100c may each include one or more displays 32, one or more audio devices 34, one or more image capture devices or cameras 36, one or more audio sensors 38, a local processor 112 and a network interface 114. The participant systems each preferably include an image capture device 36 and display 32 for each conference participant at that remote site. For example, participant system 30 at remote site 100a includes an image capture device 36 and a display 32 for participant 90a, while participant system 30 at remote site 100b includes an image capture device 36 and a display 32 for each participant 90b-90d. Similarly, participant system 30 at remote site 100c includes an image capture device 36 and a display 32 for each participant 90e-90g.

Image capture device 36 captures images of a conference participant and may be implemented by any conventional or other image sensing devices (e.g., camera, CCD arrays, etc.), while displays 32 may be implemented by any conventional or other display device (e.g., monitor, etc.). Display 32 displays video images of a conference participant and may use any suitable technology that provides a realistic image (e.g., high or standard definition, high-power compression hardware, efficient encoding/decoding standards, etc.). Audio devices 34 provide audio of conference participants and may be implemented by any conventional or other devices providing audio signals (e.g., speakers, etc.). Audio sensors 38 capture audio signals of conference participants and may be implemented by any conventional or other audio sensing devices (e.g., microphones, etc.). The image capture devices, audio devices, audio sensors and displays may be arranged at the remote sites in any fashion.

Local processor 112 of each participant system 30 controls the operation and administration of videoconferencing by processing information and signals received from local image capture devices 36, audio sensors 38 and interface 114. Local processor 112 may be implemented by any conventional or other processor, device or circuitry (e.g., microprocessor, controller, processing system, circuitry, logic, etc.) to process and distribute the information. The local processor may include any commercially available or custom software (e.g., communications software, media processing software, etc.) to perform the functions described herein. Interface 114 communicates information and signals to and receives information and signals from network 102. Interface 114 may be implemented by any conventional or other communications equipment enabling exchange of information over network 102 with various elements of system 10 (e.g., remote participant systems 30, media switch 20, etc.) and/or other remote systems.

During a videoconference, participant systems 30 each capture audio and video information of their corresponding conference participants (e.g., via audio sensors 38 and image capture devices 36), and transfer the captured information (e.g., in the form of audio and video packets) over network 102 to media switch 20. Switch processor 22 analyzes the captured information, determines the conference participant considered to be the active speaker, and provides appropriate audio and video information (e.g., in the form of audio and video packets) to participant systems 30 to enable presentation of audio and video images of current and previous active speakers in an active speaker mode. In particular, audio is captured and digitized by each participant system 30 via corresponding audio sensors 38. Similarly, video is captured and digitized by each participant system 30 via corresponding image capture devices 36. Local processor 112 of each participant system 30 receives the captured audio and video information and produces respective audio and video packets for transmission to media switch 20 via interface 114 and network 102. The audio and video packets may further include various information (e.g., video and/or audio source identifiers, header, network or other addresses, controls, status, packet characteristics or attributes, protocol specific information, etc.).

The local processor further places a voice or loudness metric value (e.g., in the range of 0-100) within each audio packet that represents the loudness (e.g., or amplitude) of the audio contained in the audio packet. Media switch 20 receives the audio and video packets from participant systems 30, and switch processor 22 analyzes the loudness metric values within the audio packets to determine an active conference speaker. For example, this may be accomplished by the loudness metric value of a conference participant exceeding a threshold (e.g., in the approximate range of 30-50) for a predetermined time interval, preferably in the approximate range of one to five seconds. The threshold may be set to any suitable value and may depend upon the particular application or remote environment.

Once media switch 20 determines the presence of an active speaker, the audio and video information of that active speaker are distributed to the remaining conference participants. In particular, media switch 20 produces and transmits audio and video packets including the audio and video information of the active speaker to the remaining participant systems 30. The audio and video packets may further include any desired information (e.g., video and/or audio source identifiers, header, network or other addresses, controls, status, packet characteristics or attributes, protocol specific information, etc.). These participant systems receive the audio and video packets via interface 114 that provides the received information to local processor 112. The local processor processes the received audio and video information and forwards the information to respective audio devices 34 and displays 32 to provide audio and video images to conference participants at the corresponding remote sites of the participant systems. For example, when conference participant 90b at remote site 100b is designated as the active speaker, media switch 20 provides the audio and video information of participant 90b from corresponding participant system 30 at remote site 100b (e.g., in the form of audio and video packets) to participant systems 30 at remote sites 100a, 100c. Display 32 at remote site 100a displays video images of participant 90b, while audio devices 34 at that remote site provide the audio of participant 90b. Remote site 100c includes three displays 32. In this case, one of the displays 32 shows video images of participant 90b, while the remaining displays show the immediately preceding active speakers. The video images of the current and previous active speakers may be provided to and presented on the plural displays in any fashion (e.g., preassigned to particular displays, based on most recent active speakers, random assignment to displays, etc.). Audio devices 34 at remote site 100c provide the audio of participant 90*b*. Displays 32 at remote site 100*b* of active speaker 90*b* continue to display (and provide audio of) the previous active speakers until a new active speaker is designated that causes alteration of the video (and audio).

When a conference participant is giving a lecture (e.g., a relatively long speech with few interactions between conference participants), video images of previously active speakers are displayed to the lecturer in active speaker mode in substantially the same manner described above. However, the present invention embodiments further enable automatic detection of the lecturer, and enable the lecturer to view each of the conference participants in a round robin fashion (e.g., cycle through and present each conference participant in the audience to the lecturer for a predetermined time interval, preferably on the order of approximately ten seconds). This enables the lecturer to view the audience and interpret the audience attentiveness and reaction to the lecture.

Figure 3:
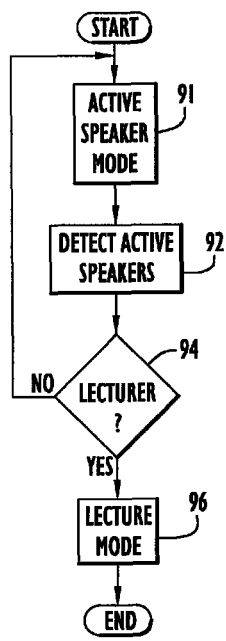
FIG. 3 is an example procedural flowchart illustrating the manner in which a lecture mode is entered during a videoconference according to an embodiment of the present invention.

Referring to FIG. 3, media switch 20 (FIG. 2) receives and processes audio and video information (e.g., in the form of audio and video packets) from participant systems 30 to provide the active speaker mode described above at step 91. Switch processor 22 further analyzes the loudness metric values within the received audio packets of active speakers to determine the presence of a lecturer at step 92. A lecturer is designated by the switch processor when a particular speaker is active for a predetermined time interval and sufficiently louder relative to other active speakers during a predetermined time interval or damping period. If an active speaker is designated as a lecturer as determined at step 94, the switch processor transitions to a lecture mode at step 96. In this case, the switch processor provides audio and video information of the designated lecturer (e.g., in the form of audio and video packets) to each of the remaining participant systems, and provides audio and video information of the remaining conference participants (e.g., in the form of audio and video packets) to the lecturer participant system to rotate through conference participants with each participant being displayed to the lecturer for a predetermined interval (e.g., in a round robin fashion), thereby enabling the lecturer to view the audience.

Figure 4:
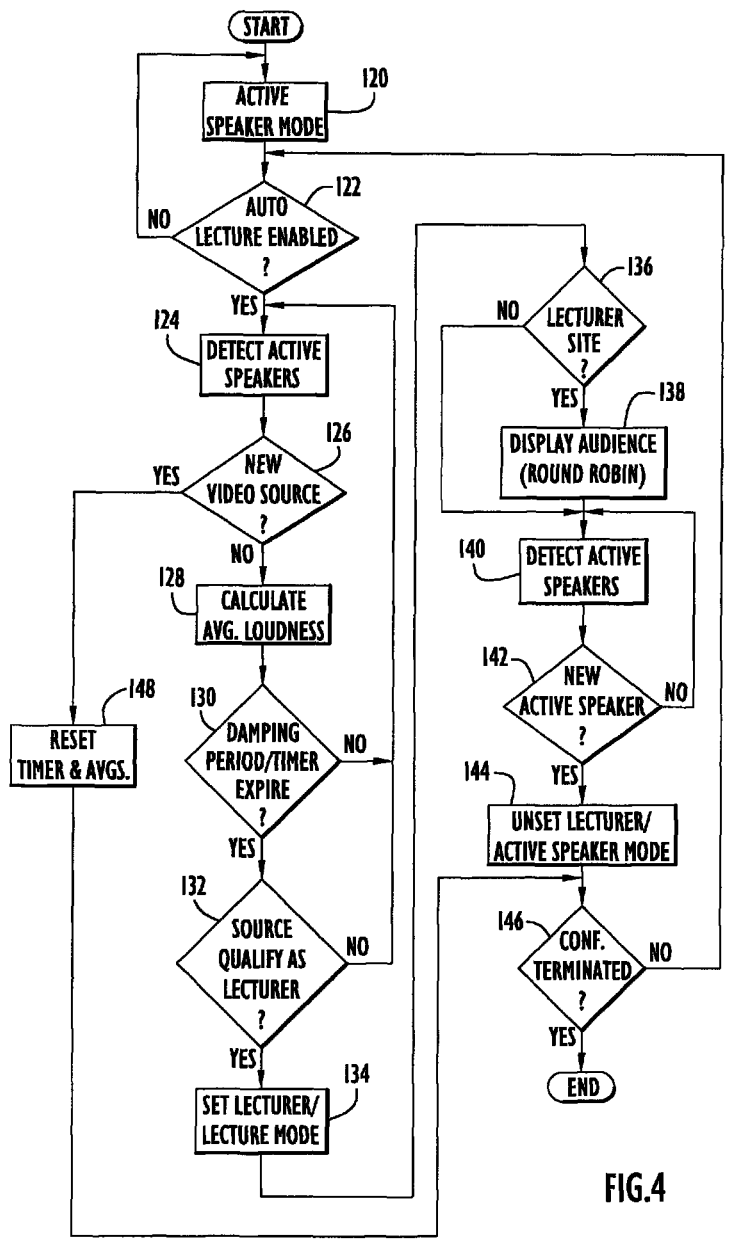
FIG. 4 is an example procedural flowchart illustrating the manner in which a lecturer is detected during a videoconference according to an embodiment of the present invention.

The manner in which videoconference system 10 detects the presence of a lecturer to enter the lecture mode is further illustrated in FIG. 4. Initially, videoconference system 10 includes a lecture parameter to enable automatic detection of a lecturer. This parameter is accessed by media switch 20 and may be enabled by a system administrator or user through a Graphical User Interface (GUI) of the media switch. In particular, a video conference is established and conducted by videoconference system 10. The system initially enters an active speaker mode at step 120. In this mode, media switch 20 determines an active speaker and distributes audio and video information of that active speaker (e.g., in the form of audio and video packets) to remaining participant systems 30 at remote sites as described above. If the lecture parameter is not enabled as determined by switch processor 22 of media switch 20 at step 122, system 10 remains in an active speaker mode.

When switch processor 22 determines at step 122 that the lecture parameter is enabled, the media switch determines the presence of a lecturer by initially detecting active speakers at step 124. Basically, the detection of a lecturer is based on examining the loudness metric values (e.g., the loudness of audio streams) within audio packets associated with active speakers in a conference. When a conference participant is designated as an active speaker, the audio and video information of that active speaker are distributed to the remaining participant systems as described above, thereby enabling the active speaker to effectively become a video source. An active speaker may be identified by media switch 20 based on conference participants that further serve as video sources (e.g., these are the active speakers competing to become a lecturer). Once speaker data is gathered over the predetermined time interval or damping period (without occurrence of any disqualifying events), the data is analyzed to determine the presence of a lecturer as described below.

In particular, if no new video sources are present (e.g., no new active speakers) as determined by switch processor 22 at step 126, the switch processor analyzes the loudness metric values within received audio packets at step 128. Specifically, switch processor 22 maintains an ongoing average of loudness metric values for each audio source or conference participant. A snapshot of these averages is periodically captured (e.g., approximately every 250 milliseconds (ms)) and averaged for each active speaker (e.g., or each audio source also serving as a video source as described above). These are the sources or active speakers that are competing to become a lecturer. The switch processor continues to process audio packets and determine loudness metric averages until expiration of a damping timer maintaining the damping period as determined at step 130. By way of example, the damping period may be set to a time interval of ten seconds; however, any suitable time interval may be utilized (e.g., in the approximate range of five to fifteen seconds). If a new video source (e.g., active speaker) is identified by media switch 20 at step 126, the loudness metric averages for active speakers and the damping timer are reset at step 148. The above process repeats at step 122 (e.g., with checking of the lecture parameter) for the active speakers (including the new active speaker) in response to continuation of the conference as determined at step 146. Resetting the loudness metric average values and damping timer in response to new video sources (e.g., new active speakers) takes advantage of switching damping, and ensures new active speakers have sufficient time to speak to switch the video. This enables the process to re-evaluate the active speakers (including the new active speaker) as described above to discriminate between a lecture and a discussion between a plurality of speakers.

Once the damping timer expires as determined by switch processor 22 at step 130, the loudness metric averages are analyzed to determine the presence of a lecturer. In particular, an active speaker is designated as a lecturer in response to the loudness metric average of that speaker exceeding a lecture threshold (e.g., set in the range of 30-50), and exceeding the loudness metric averages of remaining active speakers by a sufficient margin (e.g., the lecturer loudness metric average is preferably on the order of thirty units greater than the averages of remaining active speakers). In other words, switch processor 22 identifies the circumstances of an active dominant speaker (e.g., with a significantly greater loudness metric average relative to other active speakers) speaking for a predetermined amount of time (e.g., damping period), which typifies the conditions of a lecture situation. These criteria (e.g., a loudness metric average above the lecture threshold and a certain amount higher than other active speakers) guarantee that a lecturer is not mistakenly designated when, in actuality, a discussion is being conducted with plural dominant speakers.

If no active speakers qualify as a lecturer as determined at step 132, the above process repeats (e.g., without resetting of the damping timer and loudness metric averages for active speakers) at step 124 (e.g., with detecting active speakers) to determine a lecturer from among active speakers.

When an active speaker satisfies the criteria to become a lecturer as determined at step 132, the active speaker is set as the lecturer and system 10 transitions from active speaker mode to a lecture mode at step 134. The media switch continues to provide audio and video information (e.g., in the form of audio and video packets) to the participant systems. If a participant system is not associated with the lecturer as determined at step 136, media switch 20 provides this participant system the audio and video information of the lecturer for presentation to the one or more remote conference participants associated with that participant system. In this case, since the lecturer was already an active speaker, the participant system simply continues to receive and provide audio and video information of that active speaker (or lecturer) in a manner similar to the active speaker mode described above.

For example, when participant 90b (FIG. 2) is designated as a lecturer, media switch 20 continues to receive the audio and video information of the lecturer (e.g., in the form of audio and video packets) over network 102 from participant system 30 of remote site 100b. The media switch further receives the audio and video information from other participant systems 30 of remote sites 100a, 100c (e.g., in the form of audio and video packets). The switch processor processes and forwards the lecturer information (e.g., in the form of audio and video packets) over network 102 to participant systems 30 of remote sites 100a, 100c. Participant systems 30 of remote sites 100a, 100c receive the lecturer information from media switch 20 via respective interfaces 114. Local processor 112 of remote site 100a processes the received lecturer information to show video images of lecturer 90b on display 32 and provide audio of the lecturer via audio devices 34. Local processor 112 of remote site 100c processes the received lecturer information and preferably shows video images of lecturer 90b on the center one of displays 32, while remaining displays 32 provide no video. However, lecturer 90b (and other previous active speakers) may be displayed on displays 32 in any fashion (e.g., pre-assigned to particular displays, based on most recent active speakers, random assignment to displays, etc.). Local processor 112 of remote site 100c further provides audio of lecturer 90b via audio devices 34.

When a participant system is associated with the lecturer as determined at step 136, system 10 enables the lecturer to view conference participants in a round robin fashion (e.g., repeatedly cycle through and present conference participants in the audience to the lecturer each for a predetermined audience time interval, preferably on the order of approximately ten seconds) at step 138. In particular, switch processor 22 of media switch 20 processes received audio and video information (e.g., in the form of audio and video packets) from the participant systems and provides audio and video information of other conference participants each for the audience time interval to the lecturer participant system for presentation to the lecturer.

If the lecturer participant system includes a single display, a conference participant from each remote site is shown on that display for the predetermined audience time interval. For example, when participant 90a (FIG. 2) is designated as a lecturer, media switch 20 receives the audio and video information of the lecturer (e.g., in the form of audio and video packets) over network 102 from participant system 30 of remote site 100a. The media switch further receives the audio and video information (e.g., in the form of audio and video packets) from other participant systems 30 of remote sites 100b, 100c. Switch processor 22 processes and forwards participant information for one of the participants from remote sites 100b, 100c (e.g., in the form of audio and video packets) over network 102 to lecturer participant system 30 of remote site 100a. Lecturer participant system 30 of remote site 100a receives the participant information from media switch 20 via interface 114. Local processor 112 of remote site 100a processes the received participant information from interface 114 to show video images of the corresponding participant on display 32 and provide audio information of that participant via audio devices 34. The switch processor provides the information for each participant (e.g., in the form of audio and video packets) to the lecturer participant system for the predetermined audience time interval to provide the lecturer with audio and video information of that participant during that time interval. Once the audience interval expires, switch processor 22 provides information for the next conference participant (e.g., in the form of audio and video packets) to the lecturer participant system. In this fashion, the media switch cycles through the conference participants to enable the lecturer to view the audience. The audience or conference participants are generally cycled based on the remote site, where the system provides audio and video information for a conference participant at a remote site, and subsequently provides information for a participant from the next remote site. However, the system may alternatively provide information for each participant at a remote site prior to continuing to a subsequent site. The remote sites and conference participants of each remote site may be cycled through in any desired order or fashion.

When lecturer participant system 30 includes plural displays, other conference participants are shown on those displays each for the audience time interval as described above. However, plural conference participants from another remote site are shown on the lecturer displays simultaneously. If the quantity of lecturer site displays equals or exceeds the quantity of participants at the other remote site, all participants from that site are shown at once for the audience time interval.

For example, if participant 90b (FIG. 2) is designated as a lecturer, media switch 20 receives the audio and video information of the lecturer (e.g., in the form of audio and video packets) over network 102 from participant system 30 of remote site 100b. The media switch further receives the audio and video information (e.g., in the form of audio and video packets) of remaining conference participants 90a, 90e-90g from other participant systems 30 of remote sites 100a, 100c. Switch processor 22 processes and forwards the participant information of the one or more participants from each remote site 100a, 100c (e.g., in the form of audio and video packets) over network 102 to lecturer participant system 30 of remote site 100b. The media switch cycles through remote sites 100a, 100c to provide participant information of conference participants at those sites (e.g., in the form of audio and video packets) to lecturer site 100b, where each remote site may accommodate a single conference participant or a plurality of conference participants as described above.

With respect to remote site 100a accommodating conference participant 90a, lecturer participant system 30 of remote site 100b receives the participant information for participant 90a (e.g., in the form of audio and video packets) from media switch 20 via interface 114. Local processor 112 of remote site 100b processes the participant information from interface 114 and preferably shows video images of participant 90a on the center one of displays 32, while remaining displays 32 provide no video. However, participant 90a may be displayed on displays 32 in any fashion (e.g., pre-assigned to particular displays, random assignment to displays, etc.). Local processor 112 of remote site 100b further provides audio of participant 90a via audio devices 34.

At the end of the audience interval, the media switch provides participant information from remote site 100c. With respect to remote site 100c accommodating plural conference participants 90*e*-90*g*, lecturer participant system 30 of remote site 100*b* receives participant information for each participant 90*e*-90*g* at remote site 100*c* (e.g., in the form of audio and video packets) from media switch 20 via interface 114. Local processor 112 of remote site 100*b* processes the participant information from interface 114 and preferably shows video images of each participant 90*e*-90*g* on a corresponding one of displays 32 simultaneously. However, participants 90*e*-90*g* may be displayed on displays 32 in any fashion (e.g., pre-assigned to particular displays, random assignment to displays, etc.). Local processor 112 of remote site 100*b* further provides audio of participants 90*e*-90*g* via audio devices 34. At the end of the audience time interval, the media switch provides participant information (e.g., in the form of audio and video packets) from the next remote site in the cycle (e.g., in this example case, the media switch cycles back to remote site 100*a*) to the lecturer participant system for presentation to the lecturer as described above.

When the lecturer display quantity is less than the quantity of participants at the other remote site, the media switch may provide to the lecturer participant system for an audience interval a quantity of participants up to the quantity of lecturer displays (e.g., omit remaining participants at the other remote site and cycle to the next remote site). The particular participants provided to the lecturer participant system may be selected in any desired fashion.

Alternatively, the media switch may cycle through the participants at that other remote site and provide to the lecturer participant system during each audience interval information for a quantity of participants up to the quantity of lecturer displays. This enables the lecturer participant system to display plural participants simultaneously to the lecturer during the cycles or audience time intervals. For example, if participant 90*b* (FIG. 2) at remote site 100*b* is designated as a lecturer and another remote site (not shown) includes a participant system accommodating five conference participants (e.g., exceeding three displays 32 at remote site 100*b*), media switch 20 receives the audio and video information (e.g., in the form of audio and video packets) of the five conference participants from that remote site. In this case, the switch processor initially provides the information for three participants (e.g., in the form of audio and video packets) to the lecturer participant system for the predetermined audience time interval to provide the lecturer with audio and video information of those participants simultaneously during that time interval. Once the audience interval expires, switch processor 22 provides information for the remaining two conference participants from the remote site (e.g., in the form of audio and video packets) to the lecturer participant system to present those conference participants simultaneously to the lecturer. In this fashion, the media switch cycles through the conference participants from the remote site to enable the lecturer to view each of the conference participants. The conference participants may be cycled through in any desired order or fashion. At the end of this audience time interval, the media switch provides participant information (e.g., in the form of audio and video packets) from the next remote site in the cycle to the lecturer participant system for presentation to the lecturer as described above.

Once in lecture mode, another conference participant may speak long enough to become an active speaker (e.g., and switch the video). In this case, the media switch transitions from lecture mode (e.g., and round robin switching for the lecturer) and enters the active speaker mode described above. The media switch immediately begins the determination for a new lecturer as described above. This enables conference participants to exit lecture mode by speaking for a much shorter damping period (e.g., in the approximate range of one to five seconds) and allows for easy transition into a question and answer session at any time during the lecture. In particular, media switch 20 continues to receive audio and video information (e.g., in the form of audio and video packets) from participant systems 30. Switch processor 22 analyzes the loudness metric values within the received audio packets to determine the presence of an active conference speaker other than the lecturer at step 140. This determination may be accomplished by the loudness metric value of a conference participant exceeding a threshold for a predetermined time interval as described above.

When the switch processor determines the presence of a new active speaker at step 142, the current lecturer status is removed and the media switch transitions to the active speaker mode described above at step 144. In this case, the lecturer participant system transitions from audience or round robin viewing to presenting the current and previous active speakers as described above. If the videoconference continues as determined at step 144, the above process repeats (e.g., starting at step 122) to determine a new lecturer while in the active speaker mode.

It will be appreciated that the embodiments described above and illustrated in the drawings represent only a few of the many ways of implementing an apparatus and technique for detection of a lecturer in a videoconference.

The videoconference system may include any quantity of participant systems disposed at any quantity of sites. Each site may accommodate any quantity of participant systems, while each participant system may accommodate any quantity of participants. The participant systems (or sites) may be remote or local from each other, and may communicate in any desired fashion (e.g., network, direct communication or point-to-point, wired or wireless, etc.). In addition, the videoconferencing system elements (e.g., media switch, participant systems, scheduling manager, schedule server, server exchange, call manager, etc.) may be remote or local from each other, and may communicate in any desired fashion (e.g., network, direct communication or point-to-point, wired or wireless, etc.). The scheduling manager, schedule server, server exchange and call manager may be implemented by any quantity of any conventional or other computer or processing systems preferably equipped with one or more processors, memories, communications devices (e.g., modem, network cards, etc.) and/or any commercially available or custom software (e.g., operating system, communications software, server software, scheduling software, etc.).

The participant systems may include any quantity of image capture devices, audio sensors, audio devices and displays arranged in any desired fashion. Any quantity of these devices may be associated with a corresponding participant. The image capture devices may be implemented by any quantity of any conventional or other image sensing device (e.g., CCD, camera, etc.). The image capture device may provide any types of video for display (e.g., still pictures or images, moving images, etc.). The audio devices may be implemented by any quantity of any conventional or other devices providing audio signals (e.g., speakers, headphones, etc.). The audio sensors may be implemented by any quantity of any conventional or other sensors detecting audio signals (e.g., microphones, receivers, etc.). The displays may be implemented by any quantity of any conventional or other display devices (e.g., monitors, televisions, display screens, etc.) and may provide any suitable resolutions (e.g., standard or high definition, etc.). The network interface may be implemented by any quantity of any conventional or other communication devices (e.g., router, modem, etc.) capable of communicating over a network (e.g., WAN, LAN, Internet, etc.) via any suitable protocols. The local processor may be implemented by any quantity of any conventional or other processing devices (e.g., microprocessor, controller, circuitry, logic devices, etc.). The IP telephones may be implemented by any quantity of any suitable communication devices and may communicate via any desired protocols.

The media switch may be implemented by any quantity of any conventional or other switching device (e.g., router, gateway, computer or processing system, etc.) and may include any conventional or other switching hardware to transfer information within the videoconferencing system. The media switch with lecturer detection capability may be available as a unit independent of the videoconferencing system. The switch processor may be implemented by any quantity of any conventional or other processing devices (e.g., microprocessor, controller, circuitry, logic devices, etc.). The processors (e.g., local processor, switch processor, etc.) of the present invention embodiments may alternatively be implemented by any type of hardware and/or other processing circuitry. The timers may be implemented by any conventional or other timer (e.g., hardware, combination of hardware and software modules, etc.) and maintain any quantity or types of times (e.g., seconds, milliseconds, nanoseconds, etc.). The various functions of the processors may be distributed in any manner among any quantity of software modules or units, processors, processing or computer systems and/or circuitry, where the processors, computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the media switch and participant systems.

It is to be understood that the software for the processors (e.g., local processor, switch processor, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control.

The software of the present invention embodiments may be available on a program product apparatus or device including a recordable or computer usable medium (e.g., magnetic or optical mediums, magneto-optic mediums, floppy diskettes, CD-ROM, DVD, memory devices, etc.) for use on standalone systems or systems connected by a network or other communications medium, and/or may be downloaded (e.g., in the form of carrier waves, packets, etc.) to systems via a network or other communications medium.

The communication network may be implemented by any quantity of any type of communications network (e.g., LAN, WAN, Internet, Intranet, VPN, etc.). The devices of the videoconference system of the present invention embodiments (e.g., media switch, participant system, etc.) may include any conventional or other communications devices to communicate over the network via any conventional or other protocols. These elements may utilize any type of connection (e.g., wired, wireless, etc.) for access to the network.

The videoconference system may utilize any quantity of any types of parameters to indicate an automatic lecture mode. The media switch or participant system may provide any type of interface (e.g., GUI, menu, hardware element (e.g., switch, button, etc.)) to adjust the parameters and enable or disable the automatic lecture mode. The threshold for an active speaker or lecturer may be set to any desired level. For example, the threshold may be set based on a particular application (e.g., the threshold may be lower in a quiet environment, the threshold may be greater when a conference includes numerous participants, etc.). The damping period to determine a lecturer may be set to any desired time interval (e.g., on the order of five to fifteen seconds), while the interval for an active speaker determination may similarly be set to any desired time interval (e.g., on the order of one to five seconds and preferably less than the damping period). The loudness metric values may be of any values, and processed in any desired fashion and over any desired time interval to determine an active speaker or lecturer (e.g., a running sum exceeding a threshold, averaging, peak or maximum values, etc.). The loudness metric values may be averaged at any desired time intervals to determine a lecturer (e.g., on the order of hundreds or thousands of times a second, etc.). A lecturer may be determined based on any desired margin of the loudness metric average relative to other speakers (e.g., the maximum average or greater by any margin, be on the order of two to three times the other loudness metric averages, etc.).

The audio and video information may be transferred in any desired formats or fashions. The audio and video packets may be of any quantity, size, type or format, and may include any desired information (e.g., header, audio, video, status, controls, protocol specific information, source identifiers, addresses, etc.). The media switch and participant systems may utilize the source identifiers to identify speakers, lecturers and other conference participants.

The participant systems may display any quantity of current or previous active speakers during the active speaker mode (e.g., may include any quantity of displays, utilize any quantity of the displays, etc.). The speakers may be displayed in any order or fashion on the displays of a participant system (e.g., randomly, pre-assigned participants to displays, based on order of speaking, etc.). Any quantity of participants may be displayed on a display. The participant system of a non-lecturer may display the lecturer and any quantity of current or previous active speakers during the lecture mode (e.g., may include any quantity of displays, utilize any quantity of the displays, etc.). Alternatively, the non-lecturer participant system in a lecture mode may simply show a lecturer on one of the displays and provide no video to remaining displays.

The lecturer participant system may repeatedly cycle through and show each conference participant for any desired audience time interval (e.g., preferably on the order of one to twenty seconds). The participants at the lecturer site similarly view the conference participants in this fashion. The lecturer participant system may display any quantity of conference participants in an audience time interval during the lecture mode (e.g., may include any quantity of displays, utilize any quantity of the displays, etc.). The media switch may provide information of any quantity of participants to a lecturer participant system to simultaneously display those participants during the lecture mode. The media switch may repeatedly cycle through each participant site in any desired order or fashion during the lecture mode. For example, the media switch may provide information of each participant from a participant site prior to cycling to a subsequent site. Alternatively, the media switch may provide information for any quantity of participants from a site before cycling to a subsequent site (e.g., all conference participants may be displayed to the lecturer in a random order, etc.).

The lecturer participant system with plural displays may simultaneously display any quantity of conference participants (e.g., generally equal to or less than the quantity of displays, etc.) during the lecture mode. In the case where the quantity of participants at a site exceeds the lecturer system displays, the media switch may cycle through and provide information on any quantity of those participants (e.g., up to the quantity of displays) to the lecturer participant system for each audience interval during the lecture mode to present those participants simultaneously. The participant systems may further provide (e.g., simultaneously or serially) audio of the lecturer/active speaker and/or any quantity of previous active speakers.

The lecture mode and/or round robin viewing may alternatively be manually enabled and disabled by any user via the parameters or hardware devices (e.g., switches or buttons, etc.). Thus, a participant may switch to round robin viewing to view the audience even outside a lecture mode. In addition, the audience time interval may be adjusted by users (e.g., via parameters, hardware elements, etc.) to control the viewing time of each conference participant.

It is to be understood that each of the specific features of the embodiments described above may not necessarily be part of every embodiment of the present invention.

From the foregoing description, it will be appreciated that the invention makes available a novel apparatus and technique for detection of a lecturer in a videoconference, wherein a particular videoconference speaker is designated as a lecturer in response to the particular speaker being active for a predetermined time interval and sufficiently louder relative to the other active speakers, and the remaining videoconference participants are each presented to the lecturer for a predetermined interval to enable the lecturer to view the audience.

Having described preferred embodiments of a new and improved apparatus and technique for detection of a lecturer in a videoconference, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system comprising:
    a plurality of participant systems each associated with at least one corresponding participant of a videoconference and including a plurality of audio devices to capture and present audio information of videoconference participants, and a plurality of video devices to capture and present video information of videoconference participants, wherein each participant system produces a loudness metric for each corresponding videoconference participant indicating an amplitude of said captured audio information; and
    a switching device coupled to each participant system to receive said loudness metrics and said audio and video information of said videoconference participants, wherein said switching device includes a switch processor to process and distribute said received audio and video information, said switch processor including:
        a lecture module to analyze said received loudness metrics and designate a videoconference participant as a lecturer; and
        an audience module to cyclically distribute to one of said participant systems associated with said designated lecturer said received audio and video information of videoconference participants from others of said participant systems to facilitate presentation of each of said videoconference participants for a predetermined audience time interval to said designated lecturer.

2. The system of claim 1, wherein said lecture module includes:
    a voice module to periodically determine average values of received loudness metrics for videoconference participants and designate said lecturer based on said average values in response to expiration of a predetermined lecture time interval.

3. The system of claim 2, wherein said voice module includes:
    a speaker module to analyze and process said received loudness metrics and designate videoconference participants as speakers;
    an average module to determine an average value for each video conference participant of said received loudness metrics for that videoconference participant, and to periodically capture said average values for each speaker and produce a lecture value for each speaker by determining an average value of said captured average values for that speaker; and
    a lecturer module to designate said lecturer based on said lecture values for said speakers in response to expiration of said predetermined lecture time interval.

4. The system of claim 3, wherein said lecturer module includes:
    a margin module to compare said lecture values of said speakers and designate said lecturer in response to a corresponding lecture value exceeding a lecture threshold and exceeding lecture values of remaining speakers by a threshold value.

5. The system of claim 3, wherein said voice module further includes:
    a reset module to reset said lecture values and said predetermined lecture time interval in response to detection of a new speaker during said predetermined lecture time interval.

6. The system of claim 2, wherein said predetermined lecture time interval is in the range of five to fifteen seconds.

7. The system of claim 1, wherein said switch processor further includes:
    a view module to distribute to said others of said participant systems said received audio and video information of said designated lecturer to facilitate presentation of said designated lecturer to videoconference participants,
    wherein said view module comprises at least a first display for displaying one of said videoconference participants and a second display for displaying another of said videoconference participants.

8. The system of claim 1, wherein said switch processor further includes:
    a speaker module to analyze and process said received loudness metrics and to remove said lecturer designation in response to detection of a speaker other than said designated lecturer.

9. The system of claim 8, wherein said switch processor further includes:
    a view module to distribute to participant systems associated with videoconference participants other than said detected speaker said received audio and video information of said detected speaker to facilitate presentation of said detected speaker to those videoconference participants.

10. The system of claim 8, wherein said speaker module detects said speaker in response to said loudness metrics of a videoconference participant exceeding a threshold for a predetermined speaker time interval, wherein said predetermined speaker time interval is equal to or less than said predetermined lecture time interval.

11. The system of claim 1, wherein said predetermined audience time interval is in the range of one to twenty seconds.

12. A method comprising:
capturing audio and video information of each of a plurality of videoconference participants and producing a loudness metric for each videoconference participant indicating an amplitude of said captured audio information, the capturing being performed using a plurality of participant systems respectively associated with said plurality of video conference participants;
analyzing said loudness metrics and designating a videoconference participant as a lecturer; and
cyclically distributing to one of said participant systems associated with said designated lecturer said audio and video information of videoconference participants from others of said participant systems to facilitate presentation of each of those videoconference participants for a predetermined audience time interval to said designated lecturer.

13. The method of claim 12 further including:
periodically determining average values of said loudness metrics for videoconference participants and designating said lecturer based on said average values in response to expiration of a predetermined lecture time interval.

14. The method of claim 13 further including:
analyzing and processing said loudness metrics and designating videoconference participants as speakers;
determining an average value for each video conference participant of said loudness metrics for that videoconference participant, and periodically capturing said average values for each speaker and producing a lecture value for each speaker by determining an average value of said captured average values for that speaker; and
designating said lecturer based on said lecture values for said speakers in response to expiration of said predetermined lecture time interval.

15. The method of claim 14 further including:
comparing said lecture values of said speakers and designating said lecturer in response to a corresponding lecture value exceeding a lecture threshold and exceeding lecture values of remaining speakers by a threshold value.

16. The method of claim 14 further including:
resetting said lecture values and said predetermined lecture time interval in response to detection of a new speaker during said predetermined lecture time interval.

17. The method of claim 13, wherein said predetermined lecture time interval is in the range of five to fifteen seconds.

18. The method of claim 12 further including:
distributing to said others of said participant systems said audio and video information of said designated lecturer to facilitate presentation of said designated lecturer to videoconference participants,
wherein said distributing comprises:
displaying, in a first display, one of said videoconference participants; and
displaying, in a second display, another of said videoconference participants.

19. The method of claim 12 further including:
analyzing and processing said loudness metrics and removing said lecturer designation in response to detection of a speaker other than said designated lecturer.

20. The method of claim 19 further including:
distributing to participant systems associated with videoconference participants other than said detected speaker said audio and video information of said detected speaker to facilitate presentation of said detected speaker to those videoconference participants.

21. The method of claim 19 further including:
detecting said speaker in response to said loudness metrics of a videoconference participant exceeding a threshold for a predetermined speaker time interval, wherein said predetermined speaker time interval is equal to or less than said predetermined lecture time interval.

22. The method of claim 12, wherein said predetermined audience time interval is in the range of one to twenty seconds.

* * * * *